US011876430B2

(12) United States Patent
Riederer et al.

(10) Patent No.: US 11,876,430 B2
(45) Date of Patent: Jan. 16, 2024

(54) DEVICE FOR NOISE INSULATION OF A MACHINE

(71) Applicant: ADLER PELZER HOLDING GMBH, Hagen (DE)

(72) Inventors: Frank Riederer, Witten (DE); Thomas Karcz, Dortmund (DE); Volkmar Schulze, Schierling (DE)

(73) Assignee: ADLER PELZER HOLDING GMBH

( * ) Notice: Subject to any disclaimer, the term of this patent is extended or adjusted under 35 U.S.C. 154(b) by 333 days.

(21) Appl. No.: 17/416,870

(22) PCT Filed: Dec. 10, 2019

(86) PCT No.: PCT/EP2019/084386
§ 371 (c)(1),
(2) Date: Jun. 21, 2021

(87) PCT Pub. No.: WO2020/126661
PCT Pub. Date: Jun. 25, 2020

(65) Prior Publication Data
US 2022/0085688 A1 Mar. 17, 2022

(30) Foreign Application Priority Data
Dec. 21, 2018 (DE) ...................... 10 2018 133 366.8

(51) Int. Cl.
*H02K 5/24* (2006.01)
*B32B 1/00* (2006.01)
(Continued)

(52) U.S. Cl.
CPC .................. *H02K 5/24* (2013.01); *B32B 1/00* (2013.01); *B32B 3/06* (2013.01); *B32B 5/18* (2013.01);
(Continued)

(58) Field of Classification Search
CPC .... B32B 1/00; B32B 3/06; B32B 5/18; B32B 25/045; B32B 25/14; B32B 27/065;
(Continued)

(56) References Cited

U.S. PATENT DOCUMENTS 4,991,406 A 2/1991 Fuji et al. ........................ 62/296
5,588,810 A 12/1996 DiFlora et al. ............... 417/312
(Continued)

FOREIGN PATENT DOCUMENTS

DE 37 33 284 4/1989 ............. B60R 13/08
DE 41 32 571 10/1992 ............. B29C 67/20
(Continued)

OTHER PUBLICATIONS

U.S. Appl. No. 17/416,353, filed Jun. 18, 2021, Riedereret al.
(Continued)

*Primary Examiner* — Rashad H Johnson
(74) *Attorney, Agent, or Firm* — HAYES SOLOWAY P.C.

(57) ABSTRACT

Apparatus for sound insulation of a machine has a sleeve which has a sound-absorbing composite material wall with a plastic carrier layer. The composite material wall has two edge regions which lie against and/or above one another and each have a boundary edge which can be connected by at least one plug-in connection arrangement. The at least one plug-in connection arrangement has a plug-in tab arranged in one first edge region of the composite material wall and a receiving element which is arranged in the other second edge region of the composite material wall and into which the plug-in tab can be plugged. The plug-in tab has a web which has an end connected to the plastic carrier layer and an end section facing away from this end and having an insertion end and an upper side and an underside with at least one locking recess.

20 Claims, 5 Drawing Sheets

Figure 4:
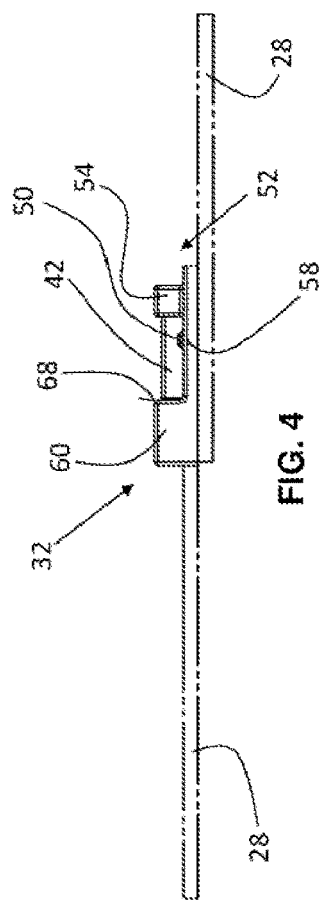

(51) Int. Cl.
  *B32B 3/06* (2006.01)
  *B32B 5/18* (2006.01)
  *B32B 25/04* (2006.01)
  *B32B 25/14* (2006.01)
  *B32B 27/06* (2006.01)
  *B32B 27/30* (2006.01)
  *B32B 27/32* (2006.01)
  *G10K 11/168* (2006.01)

(52) U.S. Cl.
  CPC ............ *B32B 25/045* (2013.01); *B32B 25/14* (2013.01); *B32B 27/065* (2013.01); *B32B 27/306* (2013.01); *B32B 27/32* (2013.01); *G10K 11/168* (2013.01); *B32B 2266/0278* (2013.01); *B32B 2274/00* (2013.01); *B32B 2307/102* (2013.01); *B32B 2307/536* (2013.01)

(58) Field of Classification Search
  CPC .................. B32B 27/306; B32B 27/32; B32B 2266/0278; B32B 2274/00; B32B 2307/102; B32B 2307/536; G10K 11/1668; H02K 5/24
  See application file for complete search history.

(56) References Cited

U.S. PATENT DOCUMENTS

| | | | | |
|---|---|---|---|---|
| 5,787,219 | A | * | 7/1998 | Mueller ............... G02B 6/4447 385/134 |
| 6,062,033 | A | | 5/2000 | Choi ................................ 62/296 |
| 2005/0056481 | A1 | | 3/2005 | Mafi et al. .................... 181/202 |
| 2006/0091699 | A1 | | 5/2006 | Braun et al. ................. 296/181.2 |
| 2007/0218790 | A1 | | 9/2007 | Schradin ......................... 442/38 |
| 2008/0099275 | A1 | | 5/2008 | Seel .............................. 181/202 |
| 2016/0285178 | A1 | * | 9/2016 | Wimmer .............. H01R 13/639 |
| 2018/0080666 | A1 | | 3/2018 | Gotou et al. ............... F24F 1/12 |
| 2020/0031292 | A1 | | 1/2020 | Riederer et al. ..... B60R 13/0846 |
| 2020/0259291 | A1 | * | 8/2020 | Lienert ............... H01R 13/5205 |
| 2021/0280991 | A1 | * | 9/2021 | De Cloet ............... H01R 4/185 |
| 2023/0082634 | A1 | * | 3/2023 | Riederer ................. F16B 21/084 24/289 |
| 2023/0178936 | A1 | * | 6/2023 | Fritsch ................... H01R 24/60 439/152 |

FOREIGN PATENT DOCUMENTS

| | | | | |
|---|---|---|---|---|
| DE | 198 33 098 | | 1/2000 | ............... B68G 7/05 |
| DE | 20 2004 008 165 | | 11/2005 | ............. B60R 13/08 |
| DE | 10 2013 006 300 | | 10/2014 | ................ F16S 1/00 |
| EP | 2 786 851 | | 4/2013 | ............. B29C 44/12 |
| JP | 7-285138 | | 10/1995 | ............. B29C 39/10 |
| WO | WO 2018/192858 | | 10/2018 | ............. B60R 13/08 |

OTHER PUBLICATIONS

International Search Report and Written Opinion issued in PCT/EP2019/084386, dated Mar. 30, 2020, with English translation, 14 pages.
International Preliminary Report on Patentability issued in PCT/EP2019/084386, dated Jun. 16, 2021, 6 pages.
International Search Report and Written Opinion issued in PCT/EP2019/084363, dated Feb. 6, 2020, with English translation, 17 pages.
International Preliminary Report on Patentability issued in PCT/EP2019/084363, dated Jun. 16, 2021, 7 pages.
Domininghaus, Hans: Die Kunststoffe und ihre Eigenschaften, 5th, completely revised and updated edition. Berlin [u.a.] : Springer, 1998, p. 285—ISBN 978-3-662-06664-5, 8 pages.
Erhard, Gunter: Konstruieren mit Kunststoffen, 4th edition, München: Hanser, 2008, p. 332-13 ISBN 978-3-446-41646-8, 5 pages.

* cited by examiner

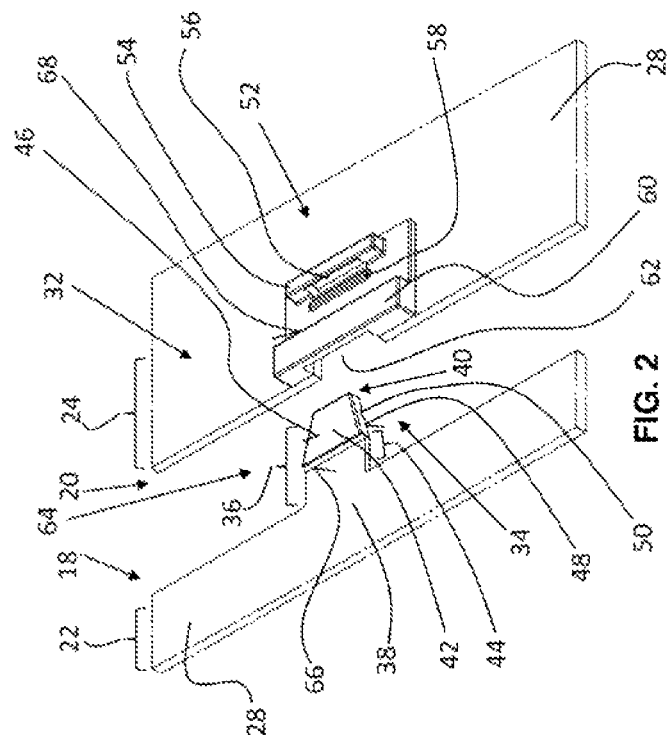
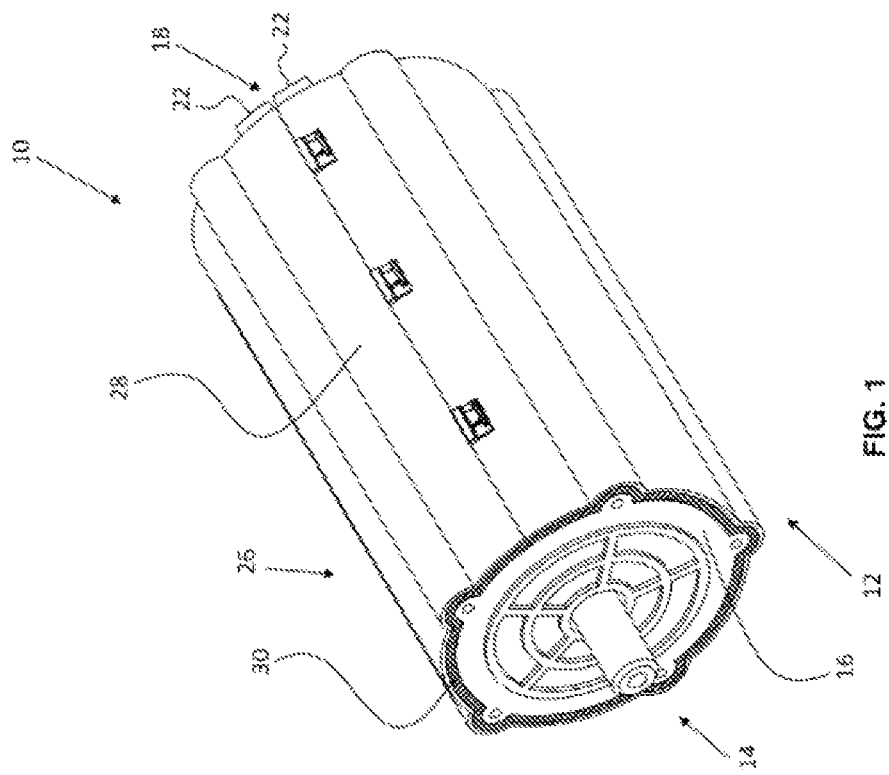

DEVICE FOR NOISE INSULATION OF A MACHINE

The present patent application claims the priority of German patent application 10 2018 133 366.8 dated 21. Dec. 2018, the contents of which are hereby incorporated by reference into the subject matter of the present patent application.

The invention relates to an apparatus for sound insulation of a machine, which is in particular an electric motor, a generator or a compressor.

To reduce noise emissions of mechanical, electromechanical or electrical machines, their housings are surrounded by sound insulation capsules. The capsules or sleeves have a to sound-absorbing composite material wall, which is provided with a plastic carrier layer as a heavy layer and a sound-absorbing layer as an inner layer in contact with the housing of the machine. Such sleeves or capsules are known, for example, for the sound insulation of electric motors used to drive vehicles.

The known sleeves or capsules, after being placed around the housing of the machine, are held together or in position by means of tapes, in particular by means of adhesive tapes or Velcro tapes. The assembly of such sound insulation is comparatively complex, which is therefore associated with additional costs.

US-A-2018/0080666, US-A-2008/0099275, US-A-2005/0056481, U.S. Pat. Nos. 4,991,406 and 6,062,033 describe various sound insulation enclosures for equipment that generates sound emissions during operation, such as compressors. Plastics and their properties are described in DOMININGHAUS, Hans: Die Kunststoffe and ihre Eigenschaften, 5th, completely revised and updated edition. Berlin [u.a.]: Springer, 1998, p. 285-ISBN 978-3-662-06664-5, while ERHARD, Gunter: Konstruieren mit Kunststoffen, 4th edition, Munchen: Hanser, 2008, p. 332-ISBN 978-3-446-41646-8 describes designing with plastics.

The object of the invention is to provide an apparatus for sound insulation of a machine which can be applied and closed in a simple manner.

To solve this problem, the invention proposes an apparatus for sound insulation of a machine, wherein the apparatus being provided with a sleeve which has a sound-absorbing composite material wall with a plastic carrier layer with a Shore-A-hardness in the range from 66 to 90, in particular in the range from 70 to 85, as outer layer and a sound-absorbing layer as inner layer, wherein the composite material wall has two edge regions lying against and/or above one another, each with a boundary edge, which can be connected against and/or above one another by means of at least one plug-in connection arrangement, wherein the at least one plug-in connection arrangement comprises a plug-in tab arranged in the one first edge region of the composite material wall and a receiving element arranged in the other second edge region of the composite material wall, into which receiving element the plug-in tab can be plugged, wherein the plug-in tab has a web which has an end connected to the plastic carrier layer and an end section facing away from this end with an insertion end and an upper side and a lower side, wherein the web has at least one locking recess on the underside of its end portion, and wherein the receiving element of the at least one plug-in connection arrangement has an insertion opening, facing the first edge region, for the insertion end and at least a part of the end portion of the web of the plug-in tab and a locking projection which, viewed in the direction of insertion of the plug-in tab into the insertion opening, is arranged in front of the latter in the second edge region and which, when the insertion end of the web of the plug-in tab is received by the insertion opening, is immersed in the locking recess on the underside thereof.

Accordingly, the invention provides for the closure for the sleeve to be an integral part of the plastic carrier layer, in the form of at least one plug-in connection arrangement. The plug-in connection arrangement has a plug-in tab on a first edge region of the composite material wall and a receiving element on a second edge region of the composite material wall, which is opposite the first edge region. The plug-in connection arrangement now allows the sleeve to be held together or "closed" at the two edge regions of the composite material wall. The sleeve can have more than two parts, each of which comprises a sound-absorbing composite material wall. In the closed state, each part of the sleeve is then connected to an adjacent sleeve part by at least one plug-in connection arrangement.

The plug-in tab and the receiving element of each plug-in connection arrangement should have a certain flexibility. In this respect, it is advantageous if the plastic carrier layer consists of a material whose Shore-A-hardness is in the range of 66 to 90 and in particular in the to range of 70 to 85. Suitable plastic materials for the carrier layer (heavy layer) are, for example, EVA/PE, PE, PP, EPDM, TPE, TPO.

PU foams are particularly suitable as a material for the sound-absorbing layer.

The plug-in tab, which is made of the plastic carrier layer material, has a web which has a first end connected to the plastic carrier layer and an end section facing away from this end with an insertion end as the second end and a top side and a bottom side. The web of the plug-in tab thus protrudes from the edge region of the composite material wall. On the underside of the end section of the web, the web has at least one locking recess into which a locking projection of the receiving element is immersed when the plug-in connection between the plug-in tab and receiving element is implemented. The receiving element also has an insertion opening for the insertion end of the plug-in tab and, if applicable, for at least a part of the end section of the web of the plug-in tab. The locking projection is located in front of the insertion opening as viewed in the insertion direction of the tab (into the insertion opening). In the plug-in connection state, the insertion end with the associated end section of the web of the plug-in tab is in contact with the edge region of the composite material wall, which is located locally in front of the plug-in opening. The locking projection is located in this area, so that it now projects into the locking recess and ensures locking and position retention of the plug-in tab when the insertion end of the plug-in tab is received by the insertion opening. In particular, if the plug-in connection arrangement is arranged in a convexly curved region of the housing of the sound-insulated machine, the close contact of the soundproofing layer with the housing of the machine ensures a certain contact pressure of the plug-in tab from the outside against the edge region of the composite material wall in the region in front of the insertion opening. This counteracts a "lifting" of the plug-in tab and thus a disconnection of the locking projection and locking recess, so that the plug-in connection withstands the pressure exerted during normal operation of the machine or during normal operation of the possi-bly movable structure (e.g. vehicle) on or in which the sound-insulated machine is arranged.

In order to further secure the plug-in connection, it is provided in accordance with a further development of the invention that a holding-down bracket is arranged between the locking projection of the receiving element and the boundary edge of the second edge region, which holding-down bracket forms a push-through opening for the plug-in tab arranged in front of the locking projection viewed in the insertion direction of the plug-in tab into the insertion opening. In this further development of the invention, there is a holding-down bracket in front of the insertion opening of the receiving element, viewed in the insertion direction, under which the plug-in tab must be moved in order to insert the insertion end of the web into the insertion opening of the receiving element. The locking projection of the receiving element is located between the holding-down bracket and the insertion opening or, if necessary, also below the holding-down bracket. Thus, the engagement of the locking projection and the locking recess is either additionally secured by the holding-down bracket or this engagement of the two aforementioned components is located between the holding-down bracket and the insertion opening and is thus secured against unintentional opening.

Since the plug-in tab has to be moved over the locking projection located in front of the insertion opening before it is inserted into the insertion opening and, if necessary, also has to be moved under the hold-down bracket, it is advantageous if both the plug-in tab and the receiving element are designed to be flexible or elastic to a certain extent. In this respect, it is advantageous if the plastic material of the carrier layer from which both the plug-in tab and also the receiving element are formed has a certain flexibility, which is ensured by plastic material with the Shore-A-hardness range specified above.

The plug-in tab can protrude from the boundary edge of the first edge area of the composite material wall; however, it is also possible that the edge area of the boundary edge of the composite material wall runs below the plug-in tab, i.e. the plug-in tab is arranged above the edge area. In the closed state of the plug-in connector arrangement, the edge region of the opposite boundary edge of the composite material wall is then located between the plug-in tab and the edge region. Either both layers of the composite material wall are arranged in this intermediate space or only the sound-absorbing layer or only the plastic carrier layer.

As already explained above, it is expedient if the plug-in tab and the receiving element are formed in one piece with the plastic carrier layer. However, it is also possible that the plug-in tab and the receiving element are manufactured as separate elements in order to then be fastened, for example by gluing or welding, to the plastic carrier layer in the edge areas of the said boundary edges. Other fastening options, such as mechanical fastening elements (e.g. riveting), are also possible.

In order to further improve the cohesion of the plug-in tab and the receiving element, it can be provided that the end section of the web of the plug-in tab has a raised thickened area on its upper side. In this case, it can be provided that the entire end section of the web is thickened in relation to the rest of the web and is raised on the upper side.

Furthermore, it can be advantageously provided that the thickening region has a locking shoulder facing away from the insertion end of the web of the plug-in tab, which shoulder is formed by a locking surface extending in par-ticular substantially orthogonally to the upper side of the web and is provided for abutment against the edge of the holding-down bracket of the receiving element facing the insertion opening. On the upper side of the web there is a thickening which, towards the end of the compression facing away from the insertion end, forms a locking shoulder in the form of a locking surface extending in particular orthogonally to the upper side of the web. This locking surface can also form an undercut, i.e. form an acute angle between itself and the web in the area of the web adjoining the locking surface. The locking surface now rests against the edge of the holding-down bracket of the receiving element facing the insertion opening, i.e. it is "trapped" between the insertion opening and the retaining bar.

In an expedient further development of the invention, it can further be provided that a thickening forming the insertion opening of the receiving element on and/or at the plastic carrier layer, the locking projection of the receiving element as well as the web of the plug-in tab and, if present, the holding-down bracket of the receiving element as well as the thickened region of the web of the plug-in tab with locking shoulder are made of the material of the plastic carrier layer.

Furthermore, it can be advantageously provided that a thickening forming the insertion opening of the receiving element on and/or at the plastic carrier layer, the locking projection of the receiving element as well as the web of the plug-in tab and, if present, the holding-down bracket of the receiving element as well as the thickened area of the web of the plug-in tab with locking shoulder are made of the material of the plastic carrier layer in one piece therewith.

Finally, it can also be advantageously provided that the sound-absorbing layer on one edge region of the composite material wall rests on and/or at the plastic carrier layer of the other edge region of the composite material wall. The design of the contact surfaces on the two boundary edges of the sleeve or two parts of the sleeve connected to each other by the plug-in connection arrangement can be designed differently, depending on the requirement. For example, it is possible for the sound-absorbing layer at one boundary edge to overlap the outer plastic support layer at the other boundary edge. Also, the sound insulation layers at the boundary edges can contact each other. Finally, when connecting said boundary edges, to it can also be provided that they form a form fit with each other by shaping the plastic carrier layers accordingly (a protrusion of the plastic carrier layer at one boundary edge dips from below into a depression in the plastic carrier layer of the other boundary edge). This additionally holds the two parts of the sleeve to be joined together.

In a further advantageous embodiment of the invention, it can be provided that the composite material wall of the sleeve is formed in multiple parts and that the individual parts of the composite material wall are mechanically connected to each other by one or more respective plug-in connection arrangements according to the invention and/or at least one of its embodiments mentioned above.

Alternatively, the sleeve can comprise two half-shells, each of which comprises a composite material wall, that the two half-shells are movably connected to each other for unfolding and for folding, that the composite material wall of each half-shell comprises an edge region, and that the composite material walls of both half-shells are mechanically connected to each other at their edge regions by means of one or more plug-in connection arrangement according to the invention and/or at least one of its above-mentioned embodiments.

Figure 3:
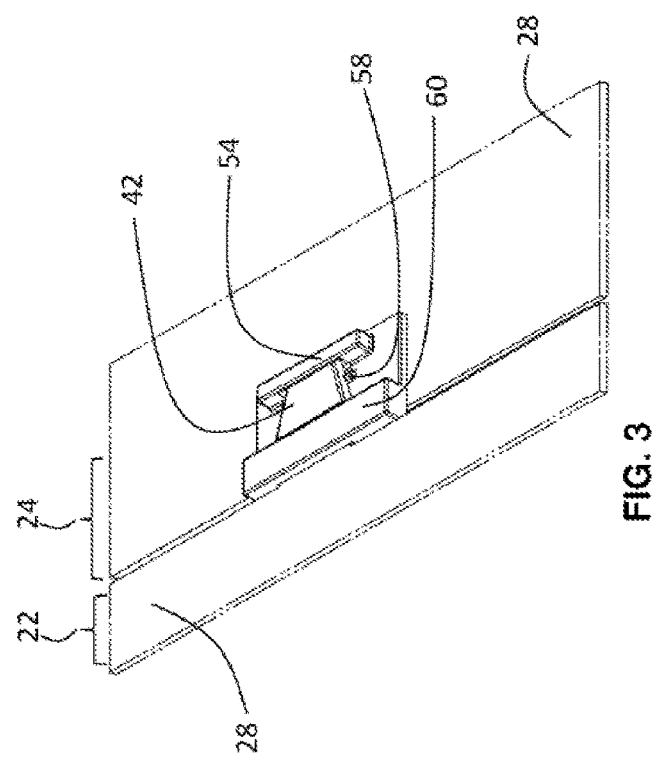
Figure 6:
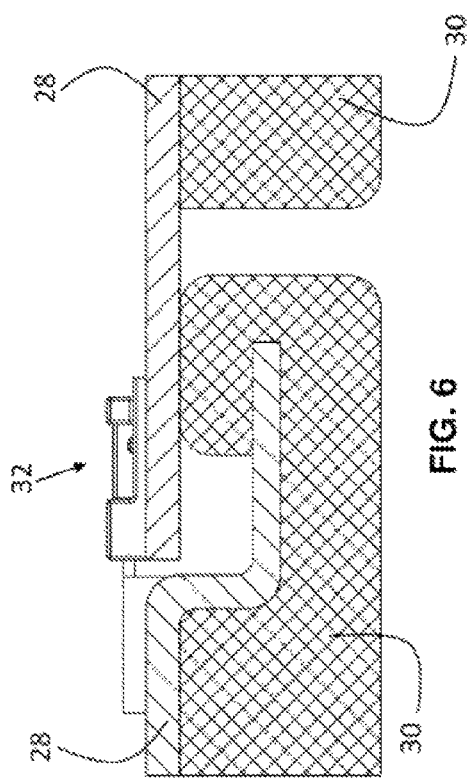
Figure 5:
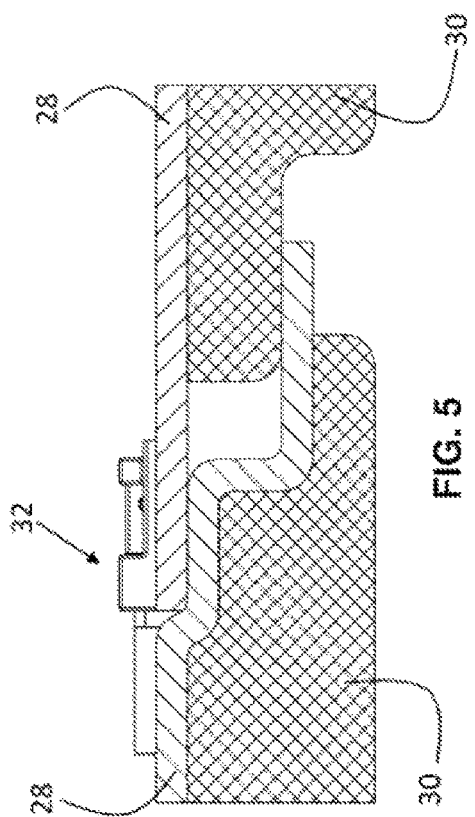
Figure 8:
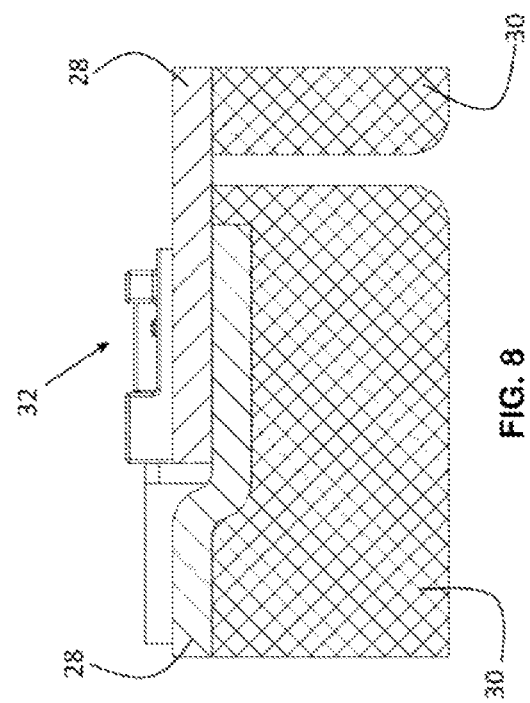

The invention is explained in more detail below by means of an example of an embodiment and with reference to the drawing. In detail, this shows:

FIG. 1 shows a perspective and schematic view of the encapsulation or sheathing of the housing of an electric motor with a sound-insulating sleeve according to an embodiment of the invention, FIGS. 2 to 4 different views (perspective or side view) of a plug-in connector assembly in the not yet connected state (FIG. 2) and in the connected state (FIGS. 3 and 4) and FIGS. 5 to 10 different alternatives for the overlapping of composite material walls of two sleeve parts of the sound insulation device to be connected to each other.

FIG. 1 shows in very general terms a field of application of the sound insulation device 10 according to the invention. In this embodiment, a sleeve 12 is used for sound insulation of an to electric motor 14, around whose housing 16 the sleeve 12 is placed. In this case, the sleeve 12 encloses the housing 16 of the electric motor 14 as closely as possible.

In FIG. 1, the sleeve 12 is in the form of a preformed ring or collar or web material, wherein the sleeve being slotted and thus having two boundary edges 18, 20 which define abutting edge regions 22, 24 when the sleeve 12 is closed.

The sleeve 12 has a composite material wall 26, which has an outer plastic carrier layer 28 and an inner sound-absorbing layer 30. Both layers are joined together to prevent accidental detachment. This is done, for example, in a tool into which the prefabricated plastic carrier layer 28 is inserted in order to then mould the sound-absorbing material against this plastic carrier layer 28. This technology is known in principle and will not be explained further here.

The basic structure of a plug-in connection arrangement 32, with which, with reference to the embodiment example according to FIG. 1, the sleeve 12 can be closed along the two boundary edges 18, 20, is shown in FIGS. 2 to 4. A plug-in tab 34 projects from the boundary edge 18 which includes a web 36 having a first end 38 integrally connected to the edge portion 22. The end of the plug-in tab 34 opposite the first end 38 forms an insertion end 40 on an end portion 42 of the plug-in tab 34 that is thickened in this embodiment. The insertion end 40 is thickened relative to the portion 44 of the plug-in tab 34 facing the end 38. The plug-in tab 34 has an upper side 46 and a lower side 48. On the underside 48 of the thickened end section 42 of the plug-in tab 34 a locking recess 50 is located, which is formed as a groove running transversely to the extension of the plug-in tab 34.

In the edge region 24 of the opposite boundary edge 20, a receiving element 52 of the plug-in connection arrangement 32 is located on the plastic carrier layer 28. This receiving element 52 has an upwardly projecting rib 54 in which an insertion opening 56 is formed which is directed towards the opposite boundary edge 18 or is open towards this boundary edge 18. This insertion opening 56 is formed in the manner of a blind hole opening. In front of the insertion opening 56 there is a locking projection 58 of the receiving element 52, which is formed in the manner of an elongated thickening or rib.

If the insertion end 40 of the preferably conically tapering end section 42 is now inserted into the insertion opening 56, the insertion end 40 must first be moved over the locking projection 58 located in front of the insertion opening in order to then enter the insertion opening 56 by pressing down. The insertion end 40 of the plug-in tab 34 located in the insertion opening 56 to of the receiving element 52 thus holds down the insertion end 40 and the front part of the end section 42 of the plug-in tab 34, and thus holds the locking projection 58 in engagement with the locking recess 50.

In addition, the receiving element 52 advantageously has a holding-down bracket 60 which is positioned in front of the locking projection 58 and is preferably aligned with the limiting edge 20. The holding-down bracket 60 forms a passage 62 below it, through which the plug-in tab 34 must be guided so that its insertion end 40 can be inserted into the insertion opening 56. The height of the passage 62, i.e. the distance between the underside of the plastic carrier layer and the underside of the holding-down bracket 60, is preferably equal to the thickness of the web 36 of the plug-in tab 34 in its section 44. The plug-in tab 34 is now guided with its thickened end section 42 under the holding-down bracket 60. The thickened end section 42 forms at its rear end with respect to the insertion direction a locking shoulder 64 with a preferably orthogonally extending locking surface 66, which in the mated state of the plug-in connection arrangement rests against the edge 68 of the hold-down bracket 60 facing the insertion opening 56. The thickened end portion 42 is thus "trapped" in this manner between the rib 54 of the receiving element 52 and the hold-down bracket 60. This can be seen in FIGS. 3 and 4.

Figure 7:
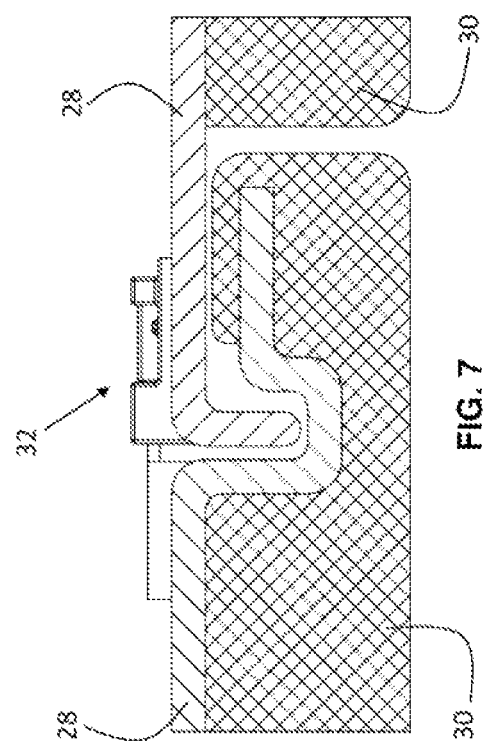
Figure 9:
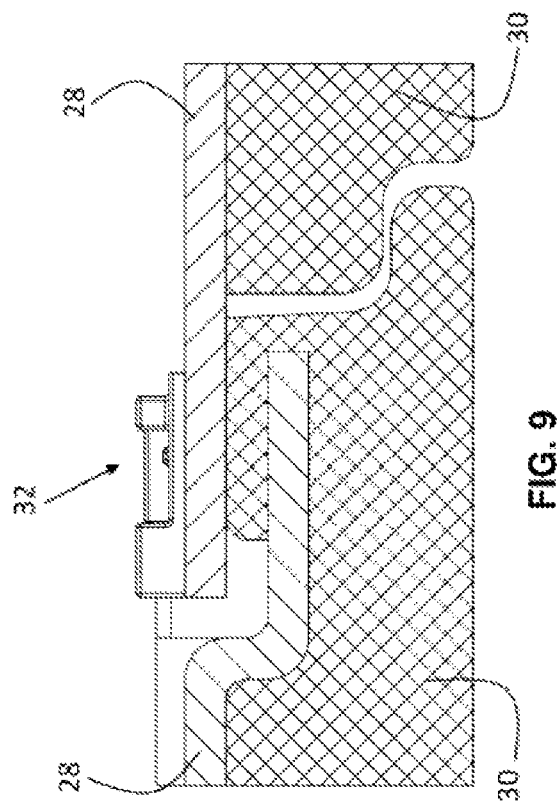
Figure 10:
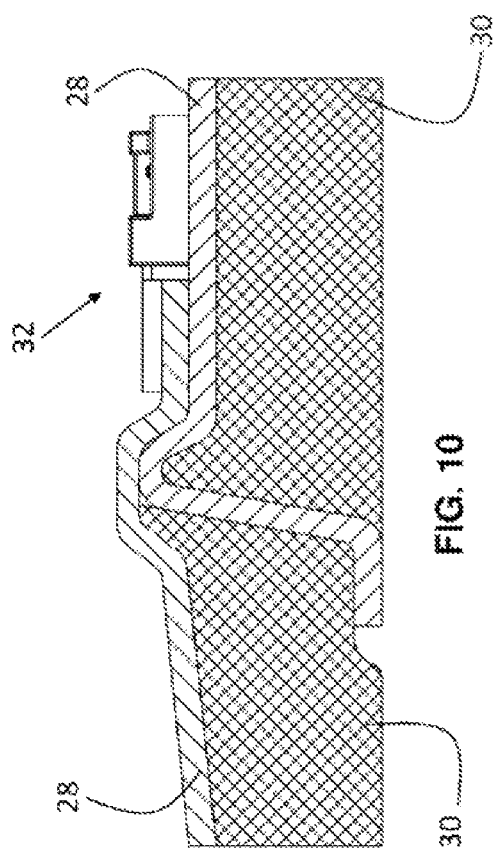

In FIGS. 5 to 10 different designs of the overlapping edge regions 22, 24 of the boundary edges 18, 20 are shown. The differences consist mainly in the fact that the plastic carrier layers at the boundary edges are partially enclosed by the sound-absorbing material (see, for example, FIGS. 6 and 9). In part, the plastic carrier layers 28 lie directly on top of each other within their edge regions (see for example FIGS. 5, 8 and 10), wherein in addition the sound damping material of the sound damping layer 30 also lies on the plastic carrier layer of the other edge region at one edge region (again see for example FIGS. 5, 8 and 10). FIG. 7 shows an additional form-fit connection in the edge areas of the plastic carrier layer 28. FIG. 10 also shows such a form-fit connection. In both cases, the cohesion of the sleeve is improved at its boundary edges.

REFERENCE LIST 10 sound insulation device
12 sleeve
14 electric motor
16 housing
18 boundary edge
20 boundary edge
22 border area of the boundary edge
24 border area of the boundary edge
26 composite material wall
28 plastic carrier layer
30 sound damping layer
32 plug-in connector assembly
34 plug-in tab of the plug-in connection assembly
36 web of the plug-in tab
38 end of the web
40 insertion end of the web
42 end section of the plug-in tab
44 section of the plug-in tab
46 upper side of the plug-in tab
48 lower side of the plug-in tab
50 locking recess of the plug-in tab
52 receiving element of the plug-in connector assembly
54 rib
56 insertion opening of the receiving element
58 locking projection of the receiving element
60 holding-down bracket of the receiving element 62 passage under the holding-down bracket
64 locking shoulder
66 locking surface
68 edge of the holding-down bracket

BIBLIOGRAPHY

US-A-2018/0080666
US-A-2008/0099275
US-A-2005/0056481
U.S. Pat. No. 4,991,406
U.S. Pat. No. 6,062,033
DOMININGHAUS, Hans: Die Kunststoffe and ihre Eigenschaften, 5th, completely revised to and updated edition. Berlin [u.a.]: Springer, 1998, p. 285-ISBN 978-3-662-06664-5
ERHARD, Gunter: Konstruieren mit Kunststoffen, 4th edition, Munich: Hanser, 2008, p. 332-ISBN 978-3-446-41646-8

The invention claimed is:

1. An apparatus for sound insulation of a machine, with a sleeve which has a sound-absorbing composite material wall with a plastic carrier layer with a Shore-A-hardness in the range from 66 to 90, in particular in the range from 70 to 85, as outer layer and a sound-absorbing layer as inner layer,
wherein the composite material wall has two edge regions which lie against and/or above one another and each have a boundary edge configured to be connected to one another and/or to one another by at least one plug-in connection arrangement,
wherein the at least one plug-in connection arrangement has a plug-in tab arranged in the one first edge region of the composite material wall and a receiving element which is arranged in the other second edge region of the composite material wall and into which the plug-in tab can be plugged,
wherein the plug-in tab has a web which has an end connected to the plastic carrier layer and an end section facing away from this end with an insertion end and an upper side and a lower side,
wherein the web has at least one locking recess on the underside of its end portion, and
wherein the receiving element of the at least one plug-in connection arrangement has an insertion opening facing the first edge region for the insertion end and at least a part of the end portion of the web of the plug-in tab and a locking projection arranged in front of the insertion opening in the second edge region as viewed in the direction of insertion of the plug-in tab into the insertion opening, which, when the insertion end of the web of the plug-in tab is received by the insertion opening, is immersed in the locking recess on the underside thereof.

2. The apparatus according to claim 1, wherein between the locking projection of the receiving element and the boundary edge of the second edge region there is arranged a holding-down bracket which, viewed in the insertion direction of the plug-in tab into the insertion opening, forms a through-opening for the plug-in tab arranged in front of the locking projection.

3. The apparatus according to claim 2, wherein the web of the plug-in tab projects from the boundary edge of the first edge region of the composite material wall, and in that the receiving element is arranged in the second edge region of the composite material wall.

4. The apparatus according to claim 2, wherein the plug-in tab and the receiving element of the at least one plug-in connection arrangement are arranged on and/or at the plastic carrier layer and, in particular, are formed integrally with the plastic carrier layer.

5. The apparatus according to claim 2, wherein the end portion of the web of the plug-in tab has a raised thickened region on its upper surface.

6. The apparatus according to claim 5, wherein the thickened region has a locking shoulder facing away from the insertion end of the web of the plug-in tab, which locking shoulder is formed by a locking surface extending in particular substantially orthogonally to the upper side of the web and is provided for bearing against the edge, facing the insertion opening, of the holding-down bracket of the receiving element.

7. The apparatus according to claim 2, wherein a thickening forming the insertion opening of the receiving element on and/or at the plastic carrier layer, the locking projection of the receiving element as well as the web of the plug-in tab and, the holding-down bracket of the receiving element, if present, and the thickened region of the web of the plug-in tab with locking shoulder are made of the material of the plastic carrier layer.

8. The apparatus according to claim 2, wherein a thickening forming the insertion opening of the receiving element on and/or at the plastic carrier layer, the locking projection of the receiving element as well as the web of the plug-in tab and, the holding-down bracket of the receiving element, if present, and the thickened region of the web of the plug-in tab with locking shoulder are made of the material of the plastic carrier layer in one piece with the latter.

9. The apparatus according to claim 2, wherein the sound damping layer on one edge region of the composite material wall rests on and/or against the plastic carrier layer of the other edge region of the composite material wall.

10. The apparatus according to claim 2, wherein the composite material wall of the sleeve is formed in multiple parts and in that the individual parts of the composite material wall are mechanically connected to one another by one or more respective plug-in connection arrangements,
wherein the plug-in connection arrangement has a plug-in tab arranged in the one first edge region of the composite material wall and a receiving element which is arranged in the other second edge region of the composite material wall and into which the plug-in tab can be plugged,
wherein the plug-in tab has a web which has an end connected to the plastic carrier layer and an end section facing away from this end with an insertion end and an upper side and a lower side,
wherein the web has at least one locking recess on the underside of its end portion, and
wherein the receiving element of the at least one plug-in connection arrangement has an insertion opening facing the first edge region for the insertion end and at least a part of the end portion of the web of the plug-in tab and a locking projection arranged in front of the insertion opening in the second edge region as viewed in the direction of insertion of the plug-in tab into the insertion opening, which, when the insertion end of the web of the plug-in tab is received by the insertion opening, is immersed in the locking recess on the underside thereof.

11. The apparatus according to claim 2, wherein the sleeve has two half-shells, each of which has a composite material wall, in that the two half-shells are movably connected to each other for unfolding and for folding, in that the composite material wall of each half-shell has an edge region, and in that the composite material walls of both half-shells are mechanically connected to each other at their edge regions by one or more plug-in connection arrangements, wherein the plug-in connection arrangement has a plug-in tab arranged in the one first edge region of the composite material wall and a receiving element which is arranged in the other second edge region of the composite material wall and into which the plug-in tab can be plugged, wherein the plug-in tab has a web which has an end connected to the plastic carrier layer and an end section facing away from this end with an insertion end and an upper side and a lower side, wherein the web has at least one locking recess on the underside of its end portion, and wherein the receiving element of the at least one plug-in connection arrangement has an insertion opening facing the first edge region for the insertion end and at least a part of the end portion of the web of the plug-in tab and a locking projection arranged in front of the insertion opening in the second edge region as viewed in the direction of insertion of the plug-in tab into the insertion opening, which, when the insertion end of the web of the plug-in tab is received by the insertion opening, is immersed in the locking recess on the underside thereof.

12. The apparatus according to claim 1, wherein the web of the plug-in tab projects from the boundary edge of the first edge region of the composite material wall, and in that the receiving element is arranged in the second edge region of the composite material wall.

13. The apparatus according to claim 1, wherein the plug-in tab and the receiving element of the at least one plug-in connection arrangement are arranged on and/or at the plastic carrier layer and, in particular, are formed integrally with the plastic carrier layer.

14. The apparatus according to claim 1, wherein the end portion of the web of the plug-in tab has a raised thickened region on its upper surface.

15. The apparatus according to claim 14, wherein the thickened region has a locking shoulder facing away from the insertion end of the web of the plug-in tab, which locking shoulder is formed by a locking surface extending in particular substantially orthogonally to the upper side of the web and is provided for bearing against the edge, facing the insertion opening, of the holding-down bracket of the receiving element.

16. The apparatus according to claim 1, wherein a thickening forming the insertion opening of the receiving element on and/or at the plastic carrier layer, the locking projection of the receiving element as well as the web of the plug-in tab and, the holding-down bracket of the receiving element, if present, and the thickened region of the web of the plug-in tab with locking shoulder are made of the material of the plastic carrier layer.

17. The apparatus according to claim 1, wherein a thickening forming the insertion opening of the receiving element on and/or at the plastic carrier layer, the locking projection of the receiving element as well as the web of the plug-in tab and, the holding-down bracket of the receiving element, if present, and the thickened region of the web of the plug-in tab with locking shoulder are made of the material of the plastic carrier layer in one piece with the latter.

18. The apparatus according to claim 1, wherein the sound damping layer on one edge region of the composite material wall rests on and/or against the plastic carrier layer of the other edge region of the composite material wall.

19. The apparatus according to claim 1, wherein the composite material wall of the sleeve is formed in multiple parts and in that the individual parts of the composite material wall are mechanically connected to one another by one or more respective plug-in connection arrangements, wherein the plug-in connection arrangement has a plug-in tab arranged in the one first edge region of the composite material wall and a receiving element which is arranged in the other second edge region of the composite material wall and into which the plug-in tab can be plugged, wherein the plug-in tab has a web which has an end connected to the plastic carrier layer and an end section facing away from this end with an insertion end and an upper side and a lower side, wherein the web has at least one locking recess on the underside of its end portion, and wherein the receiving element of the at least one plug-in connection arrangement has an insertion opening facing the first edge region for the insertion end and at least a part of the end portion of the web of the plug-in tab and a locking projection arranged in front of the insertion opening in the second edge region as viewed in the direction of insertion of the plug-in tab into the insertion opening, which, when the insertion end of the web of the plug-in tab is received by the insertion opening, is immersed in the locking recess on the underside thereof.

20. The apparatus according to claim 1, wherein the sleeve has two half-shells, each of which has a composite material wall, in that the two half-shells are movably connected to each other for unfolding and for folding, in that the composite material wall of each half-shell has an edge region, and in that the composite material walls of both half-shells are mechanically connected to each other at their edge regions by one or more plug-in connection arrangements, wherein the plug-in connection arrangement has a plug-in tab arranged in the one first edge region of the composite material wall and a receiving element which is arranged in the other second edge region of the composite material wall and into which the plug-in tab can be plugged, wherein the plug-in tab has a web which has an end connected to the plastic carrier layer and an end section facing away from this end with an insertion end and an upper side and a lower side, wherein the web has at least one locking recess on the underside of its end portion, and wherein the receiving element of the at least one plug-in connection arrangement has an insertion opening facing the first edge region for the insertion end and at least a part of the end portion of the web of the plug-in tab and a locking projection arranged in front of the insertion opening in the second edge region as viewed in the direction of insertion of the plug-in tab into the insertion opening, which, when the insertion end of the web of the plug-in tab is received by the insertion opening, is immersed in the locking recess on the underside thereof.

* * * * *